(12) United States Patent
Shenoy et al.

(10) Patent No.: US 11,157,629 B2
(45) Date of Patent: Oct. 26, 2021

(54) IDENTITY RISK AND CYBER ACCESS RISK ENGINE

(71) Applicant: SAIX Inc., Ashburn, VA (US)

(72) Inventors: Hemanth Shenoy, Ashburn, VA (US); Phanindra Banda, Ashburn, VA (US)

(73) Assignee: SAIX INC., Ashburn, VA (US)

( * ) Notice: Subject to any disclaimer, the term of this patent is extended or adjusted under 35 U.S.C. 154(b) by 0 days.

(21) Appl. No.: 16/867,619

(22) Filed: May 6, 2020

(65) Prior Publication Data
US 2020/0356676 A1    Nov. 12, 2020

Related U.S. Application Data

(60) Provisional application No. 62/845,274, filed on May 8, 2019.

(51) Int. Cl.
| | | |
|---|---|---|
| *G06F 21/57* | (2013.01) | |
| *G06F 9/54* | (2006.01) | |
| *G06K 9/62* | (2006.01) | |
| *G06N 20/00* | (2019.01) | |

(52) U.S. Cl.
CPC .............. *G06F 21/577* (2013.01); *G06F 9/54* (2013.01); *G06K 9/6267* (2013.01); *G06N 20/00* (2019.01)

(58) Field of Classification Search
CPC ....... G06F 21/577; G06F 9/54; G06K 9/6267; G06N 20/00
See application file for complete search history.

(56) References Cited

U.S. PATENT DOCUMENTS

| | | | | |
|---|---|---|---|---|
| 8,682,708 B2* | 3/2014 | Cerminaro | ............. | G06Q 40/08 705/7.28 |
| 8,869,267 B1* | 10/2014 | Smith | .................. | G06F 21/554 726/22 |
| 9,798,883 B1* | 10/2017 | Gil | ........................ | G06F 21/577 |
| 10,467,631 B2* | 11/2019 | Dhurandhar | ......... | G06Q 20/102 |
| 10,546,122 B2* | 1/2020 | Ananthanpillai | ..... | G06F 21/577 |

(Continued)

OTHER PUBLICATIONS

Malware and Disease: Lessons from Cyber Intelligence for Public Health Surveillance, published on Oct. 1, 2016, by Frank L. Smith, III (Year: 2016).*

(Continued)

*Primary Examiner* — Jahangir Kabir

(74) *Attorney, Agent, or Firm* — MH2 Technology Law Group LLP

(57) ABSTRACT

A system for managing cyber security risks includes a memory storing instructions and a processor that executes the instructions to perform operations. The operations include receiving raw entity data for one or more entities from a source system and converting the raw entity data to processed entity data having a format different from the first entity data. The operations include extracting attributes for the entities from the processed entity data and generating an initial risk score for a selected entity based on an entity initial attribute associated with that entity. The operations also include receiving a rule for determining a rule-based risk score and generating a rule-based risk score for the selected entity based on the entity attribute of the selected entity. Additionally, the operations include generating a risk score for the selected entity based on the initial and rule-based risk scores.

22 Claims, 3 Drawing Sheets

(56) References Cited

U.S. PATENT DOCUMENTS

| | | | | |
|---|---|---|---|---|
| 10,726,374 B1* | 7/2020 | Engineer | ............ | G06Q 10/0635 |
| 2003/0188189 A1* | 10/2003 | Desai | .................... | H04L 63/104 |
| | | | | 726/23 |
| 2013/0282393 A1* | 10/2013 | Ebadollahi | ............. | G16H 50/30 |
| | | | | 705/2 |
| 2014/0344130 A1* | 11/2014 | Lawrence | .......... | G06Q 20/4016 |
| | | | | 705/35 |
| 2017/0251013 A1 | 8/2017 | Kirti et al. | | |
| 2018/0255084 A1 | 9/2018 | Kotinas et al. | | |
| 2019/0116193 A1 | 4/2019 | Wang et al. | | |

OTHER PUBLICATIONS

A Framework for Assessing Technology Risks in Transaction-Based Extended Enterprises: U.S. Capital Market Case, Friedhoff et al, Sep. 2017 (Year: 2017).*

International Search Report and Written Opinion, dated Jul. 3, 2020, issued in Patent Application No. PCT/US2020/031556 (16 pages).

* cited by examiner

IDENTITY RISK AND CYBER ACCESS RISK ENGINE

CROSS-REFERENCE TO RELATED APPLICATION

This application is based on and claims benefit of priority from U.S. Provisional Patent Application No. 62/845,274, filed May 8, 2019, the entire contents of which are incorporated herein by reference.

TECHNICAL FIELD

The present disclosure relates generally to systems and methods for monitoring cyber security risks, and more particularly to systems and methods, for providing continuous risk evaluations based on empirical evidence of change in characteristics associated with an entity.

BACKGROUND

For years, organizations have relied on traditional identity-based systems to verify identities, create accounts (e.g. accounts on a computer system), and assign entitlements to accounts so that enterprise assets may be securely accessed. The focus, however, has been mainly administrative tasks. As security requirements have increased, due to identity and related breaches, regulators have required organizations to create and comply with Identity and Access Management (IAM) policies that incorporate IAM security. This in turn has driven enterprise policies and IAM products to adopt these new security strategies. However, conventional IAM products merely bolt these policies as new add-ons to existing security stacks. To further exacerbate this situation, the emergence of distributed applications (e.g. on-premises, cloud, IOT, and mobile), mobile workforces, and de-centralized and fast-moving business priorities have significantly increased the number of identities and their respective accesses to applications/systems that require secure management for potential security risks. Moreover, identity management and access management has become the last line of defense against internal and external attacks. Attacks based on credential stealing, spoofing, and social-engineering are also on the rise. In addition, with thousands/millions of identities and access privileges to manage across thousands of users and hundreds/thousands of applications, organizations struggle to keep their authentication and authorization related cyber risks in check.

Realizing that identity systems and tools do not have the native capabilities to tackle this core challenge, organizations are turning to solutions that identify and monitor cyber security risks (e.g. authentication and authorization risks) with advanced risk driven intelligence. However, currently used solutions are incapable of detecting many potential risks because the data necessary for identifying these risks are not readily available, are relegated to siloed portions of the organization (e.g., administration), or because the data only addresses audit requirements, is used inefficiently, or not used at all. Furthermore, often organizations use products that produce risk scores in a siloed manner. Therefore, there is a need for improved methods and systems for monitoring cyber security risks. Further, there is a need to generate and normalize risk scores, and centralize risk scoring to enable remediation decisions to be made based on a standardized risk score.

The disclosed systems and methods of the present disclosure solve one or more of the problems set forth above and/or other problems of the prior art.

SUMMARY

In one aspect, the disclosed embodiments are directed to a system for managing cyber security risks. The system may include one or more memory devices storing instructions. The system may also include one or more hardware processors configured to execute the instructions to perform operations. The operations may include receiving raw entity data associated with a plurality of entities from a source system. The operations may also include converting the raw entity data to processed entity data having a format different from the raw entity data. Further, the operations may include extracting entity attributes associated with the plurality of entities from the processed entity data. The operations may include generating an initial risk score for an entity selected from the plurality of entities, the initial risk score being based on an entity attribute associated with the selected entity. The operations may also include receiving from a rule management module, at least one rule for determining a rule-based risk score. The operations may further include generating the rule-based risk score for the selected entity based on the at least one rule and the entity attribute associated with the selected entity. Additionally the operations may include generating an overall risk score for the selected entity based on the initial risk score and the rule-based risk score.

In another aspect, the disclosed embodiments are directed to a system for managing cyber security risks. The system may include one or more memory devices storing instructions. The system may also include one or more hardware processors configured to execute the instructions to perform operations. The operations may include receiving raw entity data associated with a plurality of entities from a source system. The operations may further include converting the raw entity data to processed entity data having a format different from the first entity data. The operations may also include extracting attributes associated with the plurality of entities from the processed entity data. The operations may include receiving from a rule management module, at least one governance rule for determining a governance-rule-based risk score based on at least one of the attributes. Further the operations may include generating the governance-rule-based risk score for the selected entity based on the at least one governance rule and an entity attribute associated with the selected entity. The operations may include receiving, from the rule management module, a transaction rule from for determining a transaction-rule based risk score based on at least one action performed by at least one entity in the plurality of entities. The operations may also include generating the transaction-rule-based risk score for the selected entity based on the second rule and an action performed by the selected entity. The operations may include generating the overall risk score for the selected entity based on the governance-rule-based risk score and the transaction-rule-based risk score. Additionally, the operations may include displaying the overall risk score on a display of a user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
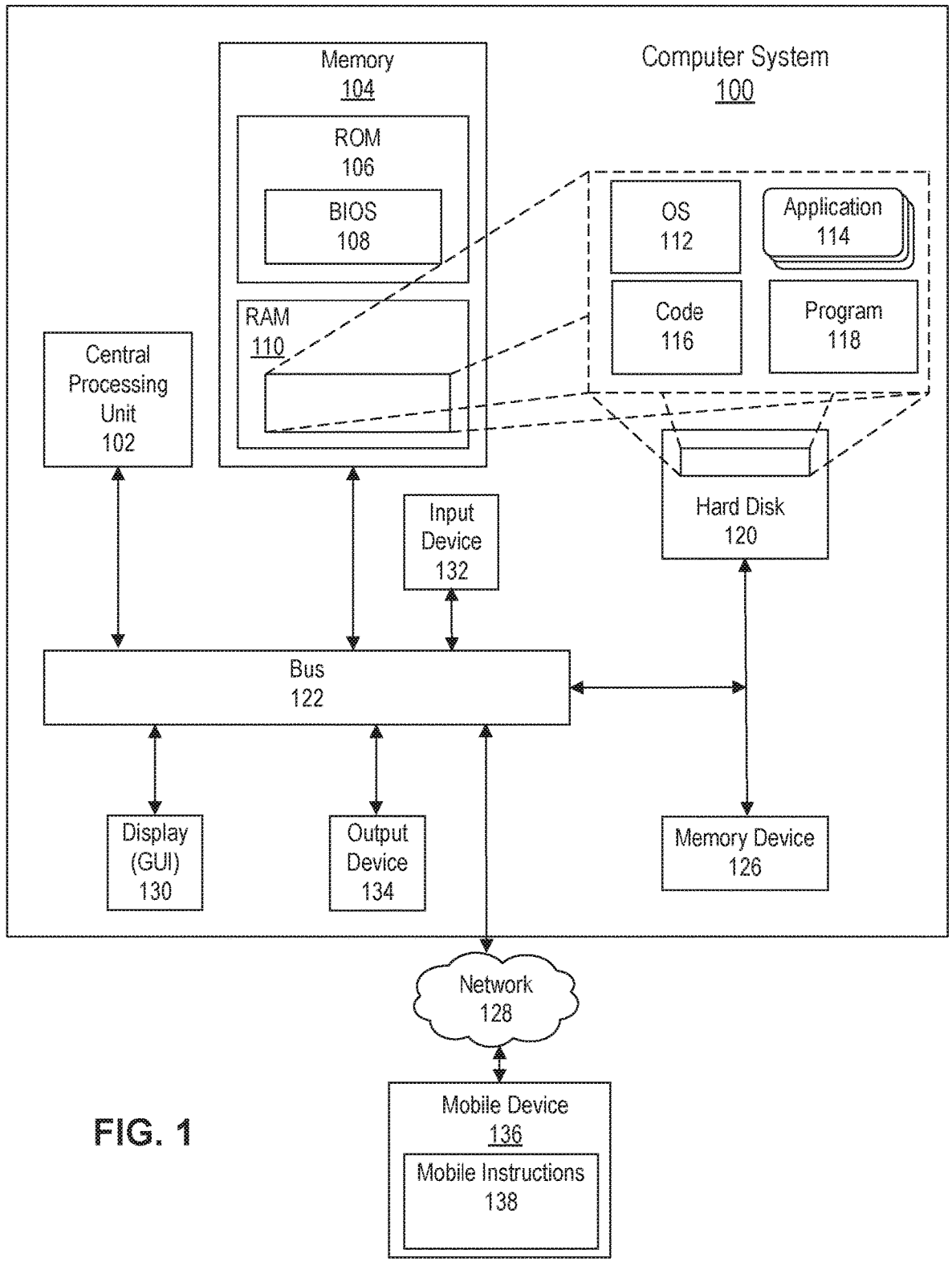
FIG. 1 depicts a block diagram of an exemplary computer system, consistent with disclosed embodiments.

The following detailed description refers to the accompanying drawings. Wherever possible, the same reference numbers are used in the drawings and in the following description to refer to the same or similar parts. While several illustrative embodiments are described herein, modifications, adaptations and other implementations are also contemplated. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples.

Embodiments of the present disclosure are directed to systems and methods configured for monitoring and managing cyber security risks by efficiently and continuously evaluating risks based on empirical evidence of changes in attributes or behaviors associated with an entity for a given context. The disclosed embodiments provide innovative technical features that enable an organization (e.g., an enterprise, a corporation, an organization, a network provider, a cloud infrastructure provider, etc.) to continuously collect entity data (structured, un-structured and semi-structured), extract attributes, and dynamically assign weights based on information gathered through a structured questionnaire that may elicit enterprise policies and procedures to determine initial risk scores. In the disclosed embodiments, structured entity data may be data that may follow a pre-defined or well-defined format. For example, structured entity data may be in the form of columns, where each of the columns may represent a particular characteristic of the entity data. Un-structured data may be unformatted and may take any form. Semi-structured data may include both formatted and un-formatted data. The disclosed embodiments may enable the organization to train and/or update one or more machine learning models by using the collected entity data, the extracted attributes and risk weights, and generate initial risk scores using the one or more rules and/or trained machine learning models.

The disclosed embodiments may generate risk scores based on known controls associated with an organization. These controls of the organization related to one or more entities may be translated into governance rules and/or trained machine learning models. Additionally, new governance rules and/or trained machined learning models may be generated based on the known attack patterns. In addition, new rules may be generated based on previously un-known patterns using one or more machine learning models. The disclosed embodiments may enable organizations to train and/or update machine learning models using governance rules to generate risk scores. Moreover, when the model is appropriately trained it may replace one or more governance rules. The disclosed embodiments may also combine a risk or generated based on a governance rule and/or trained machine learning model with an initial risk score to produce a static risk score for an entity. An output of the machine learning model and/or rules may be traceable to the output of rule that produced the risk score. For example, consider an identity entity having an attribute (employee type) that may be equal to contractor. Now consider a governance rule that assigns a high risk score when the employee type equals contractor. Thus, the high risk or may be traceable to the governance rule based on the employee type.

The disclosed embodiments may also capture and extract attributes from event data. Like entity data, event data may also be structured, un-structured and/or semi-structured. The disclosed embodiments may produce risk scores for one or more entities using transactional rules. The known controls for an organization and known attack patterns related to transactional data may be translated into rules and may be named as transactional rules. The disclosed embodiments may train and/or update one or more machine learning models using the transactional rules to produce a transactional (dynamic) risk score for one or more entity. Further, the disclosed embodiments may generate rule-based risk scores for one or more entities. The disclosed embodiments may generate overall risk scores of entities based on the static risk scores and transactional (dynamic) risk scores.

The disclosed embodiments may also ingest and/or capture risk scores generated by external systems and normalize those risk scores with static and/or transactional risk scores generated by the disclosed embodiments to produce consolidated risk scores for one or more entities in the organization. The disclosed embodiments may categorize risk score as high, medium, or low based on one or more thresholds. Additionally, each risk category may have sub-categories that may help to support risk mitigation processes by prioritizing risky entities based on attributes. For example, risk scoring and normalization module 244 may generate one or more initial risk scores, rule-based risk scores, and/or overall risk scores for a plurality of entities. Risk scoring and normalization module 244 may rank the generated risk scores and associate the ranked risk scores with the sub-categories associated with the risk categories. For example, when a plurality of overall risk scores fall into a high-risk category, risk scoring and normalization module 244 may rank those overall risk scores and assigned them to sub-categories within the high-risk category to prioritize the overall risk scores and allow remediation module 272 to recommend remediation actions for the risk scores in the high-risk category based on their ranking. The disclosed embodiments may recommend one or more remedial actions based on the generated risk scores to an organization. The disclosed embodiments may prioritize the remediation sequence to address the risks identified for one or more entities in the organization. The disclosed embodiments may also capture and extract attributes from remediation action data and may use transactional rules and/or machine learning models to produce risk score for one or more entities. For example, a user whose access was removed multiple times as part of remediation action by the system due to no activity on an application and/or system may be identified as an anomaly and a risk score may be assigned to the user, application and/or system.

FIG. 1 depicts a block diagram of an exemplary computer system 100, consistent with disclosed embodiments. Components of system 100 may include central processing unit (CPU) or processor 102, memory unit 104, and bus 122 that interconnects system components including memory 104 and CPU 102. Computer system 100 may include computer-readable media, such as volatile or nonvolatile computer storage media implemented in a method or technology suitable for storing computer-readable instructions, data structures, program modules, or the like (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other suitable medium).

Bus 122 may be a suitable type of bus structures, such as a memory bus or memory controller, a peripheral bus, and a local bus using a suitable bus architecture. By way of example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus—also known as Mezzanine bus.

Memory 104 may include computer-readable media, such as read only memory (ROM) 106 and random access memory (RAM) 110. A basic input/output system (BIOS) 108, containing the basic routines that help to transfer information between elements within computer system 100 may be stored in ROM 106. Additionally, RAM 110 may contain operating system (OS) 112, applications 114, other code 116, and program 118 that may be executed by processor 102. RAM 110 may contain data and/or program modules that are immediately accessible to and/or presently being operated on by CPU 102.

Hard disk drive 120 may be removable/non-removable and volatile/nonvolatile computer media. The hard disk drive 120 may read from or write to non-removable, non-volatile magnetic media, and a memory device 126. Other removable/non-removable and volatile/nonvolatile computer storage media that may be used in exemplary computer system 100 include, but are not limited to, magnetic tape cassettes, flash memory cards, digital versatile disks, digital video tape, solid state RAM, and solid state ROM. The disks and their associated computer media, discussed above and illustrated in FIG. 1, provide storage of computer-readable instructions, programmable code, data structures, program modules and other data for computer system 100. In FIG. 1, hard disk 120 is illustrated as storing an operating system (OS) 112, one or more applications 114, other programmable code 116, and a program 118.

A storage path may provide a physical space for bus 122 to connect hard disk drive 120 and memory device 126. Memory device 126 may be an optical disk drive or a magnetic disk drive that reads from or writes to a removable and nonvolatile storage medium such as an optical disk or magnetic disk.

A user may enter commands and information into computer system 100 through an input device 132 such as a keyboard and mouse, trackball or touch pad tablet, electronic digitizer, or microphone. Other input devices may include a joystick, game pad, satellite dish, and scanner. These and other input devices may be connected to CPU 102 through an input interface that is coupled to bus 122, or through other interfaces or bus structures, such as a parallel port, game port or a universal serial bus (USB). A display (GUI) 130 or other type of video device may also be connected to bus 122 via an interface, such as a video interface. In addition, an output device 134, such as speakers or a printer, may be connected to bus 122 through an output interface.

Computer system 100 may operate in a networked environment using a network 128 and a mobile device 136. In some exemplary embodiments, mobile device 126 may be used by an administrator, such as a marketing campaign developer, or by a user. Computer system 100 may also include a personal computer, a server, a router, a network PC, a peer device or other common network node. Mobile device 136 may include a handheld, tablet, or client device. Network 128 depicted in FIG. 1 may include a local area network (LAN), a wide area network (WAN), or other type of network. In some exemplary embodiments, programmable code and application programs may be stored in remote computers. By way of example, FIG. 1 illustrates mobile instructions 138 as residing on mobile device 136. It will be appreciated that the network connections shown are exemplary and other means of establishing communication between computers and mobile device 136 may be used. It is also contemplated that computer system 100 may include more than one of the various components illustrated in FIG. 1. Thus, for example computer system 100 may include more than one processor 102, more than one memory 104, etc.

Figure 2:
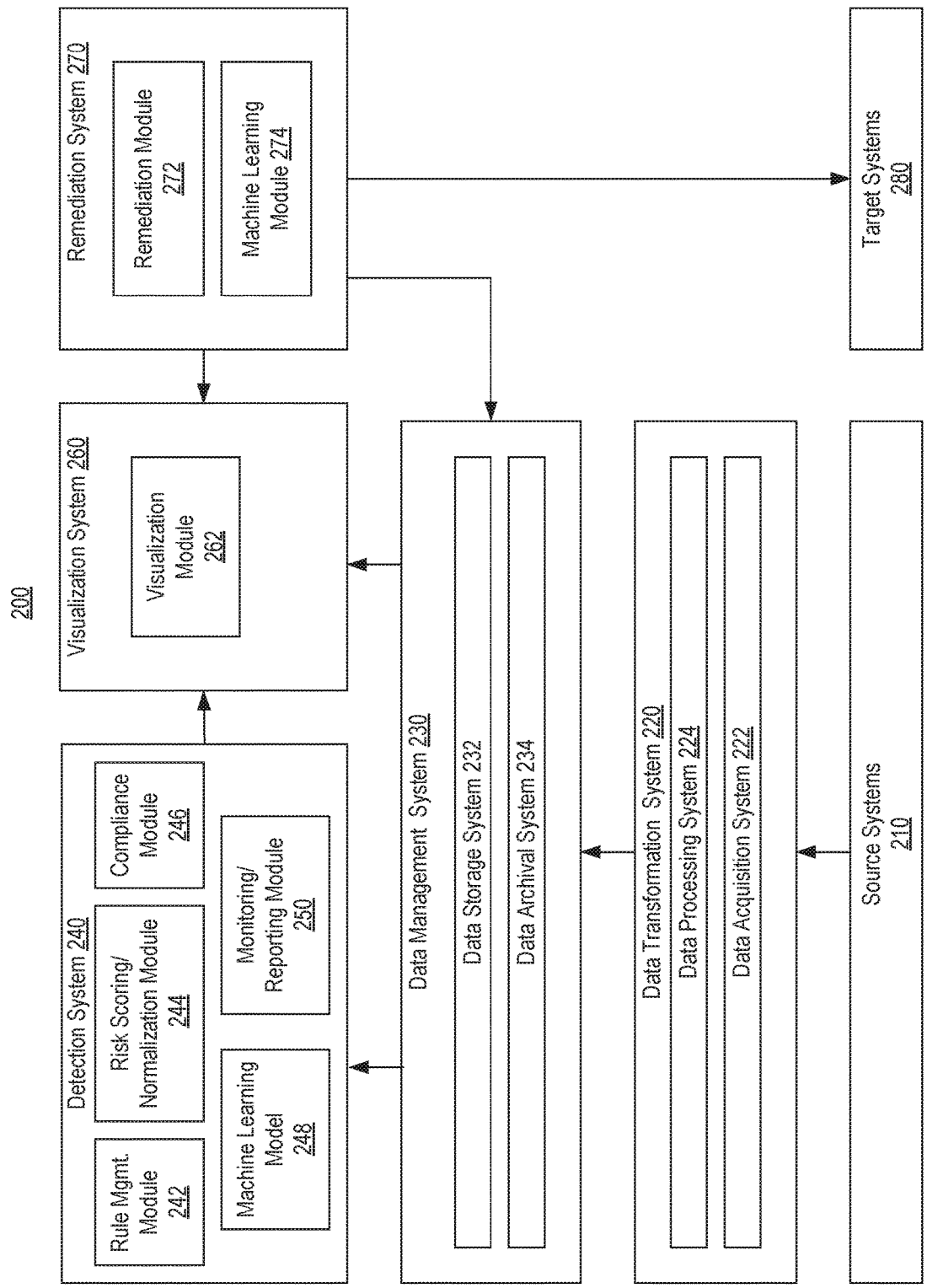
FIG. 2 depicts an exemplary architecture for a cyber security risk monitoring and remediation system, consistent with disclosed embodiments.

FIG. 2 depicts an exemplary architecture for a cyber security risk management system 200, consistent with disclosed embodiments. System 200 may be configured to provide continuous cyber-security risk evaluations based on empirical evidence of change in an entity for a given context and remediate the risk. An entity may include one or more users and/or assets associated with the organization. The entity may be any object in, for example, an IAM system that system 200 may model and store information about. For example, an entity may comprise recognizable concepts, either concrete or abstract, such as an identity of a person or a thing, an identity of an application or server, an account in an application or server, an entitlement in an application or serve, etc. An entitlement may be an entity that grants and/or resolves fine-grained access (also referred to as "authorizations," "privileges," "access rights," "permissions" and/or "rules"). Thus, an entitlement may execute information technology access policies for structured, un-structured, or semi-structured data, devices, and services. Certain entitlements may be provided by default for every entity (e.g., account associated with a user), while other entitlements may be provided on request to aid application access. An entitlement may also provide access to either one or many applications and/or systems or specific modules within the applications or system. Alternatively, in some exemplary embodiments, an entitlement may be limited to a particular aspect (e.g., read, write, update, create, delete, etc.) of the application module and/or of an entity.

An entity may be represented by its individual respective attributes. The attributes may be divided into categories: anchor attributes for identifying an entity, prime attributes for calculating risks, and descriptive or regular attributes for describing an entity. Attributes associated with identifying an entity may also be termed profile attributes (or authentication characteristics). By way of example, attributes associated with an identifying an entity (e.g., person) may include an identifier, a first name, and a last name. Other attributes associated with the identity may include, for example, department name and number, job code, title, manager name, start date, end date, username, password, telephone number, email address, etc. By way of another example, attributes associated with identifying an entity, such as an account, may include account identification number, account name, account password, identity of persons linked to the account, etc. As another example, attributes associated with identifying an entity such as an application may include, application identification number, data on frequency of application usage, registration or installation date of application, deregistration or uninstall date of the application, etc. By way of yet another example, attributes associated with identifying an entity such as an entitlement may include entitlement identifier, entitlement name, entitlement description, entitlement type (e.g., role, authorizations, privileges, access rights, permissions, rules, etc.), entitlement activation or deactivation dates, etc.

Prime attributes (or authorization characteristics) associated with an entity may be used by system 200 to determine risks associated with the entity. Prime attributes may be associated with actions and/or events that may have the potential to impact the risk scores of entities. Prime attributes may not be static, but rather may be dynamic and may change over time. Not all prime attributes may change continuously and some prime attributes, indicated as "context" may change, or may have a higher tendency to change. Context may be related to time, place, relationship, etc. associated with an entity or an action performed by an entity. By way of example, consider a situation where a user logs in at 9 PM when the "normal" log in time for that user is 8 AM. The change in the user's login time is a context change that may contribute to the risk score associated with that user. By way of another example, consider a situation where a user logs in from Atlanta, Ga., USA, and the "normal" login location is Palo Alto, Calif., USA. The change in the login location is a context change that may contribute to the risk score. A relationship context may be more subtle. For example, a user may access a record because the user has permission to do so, perhaps because the user's account belongs to a department A. If, however, the user moves from department A to B, or if the characteristics of the record were to change from normal to sensitive, the relationship context of the user to the record may change. If the user continued to access the record, the user's access may contribute to the risk score By way of another example, prime attributes may comprise an identification of role, an identification of employment type, a start date, an end date, etc. By way of further example, prime attributes with higher than usual change of context may comprise an identification of location, an identification of time period, an identification of IP address, etc. Prime attributes may be initially assigned values based on thresholds. For example, when certain indicators are beyond the acceptable thresholds, the values associated with the prime attributes may be higher. It is to be understood that the thresholds may not be predetermined. Thus, for example, the entity usage patterns may determine the thresholds. It is contemplated that in some exemplary embodiments, an initial threshold may be specified but overtime the threshold may be changed based on the usage patterns. Thus, system 200 may initially begin with some predetermined threshold and over time this threshold may change based on the information received by system 200. For example, an account entity may be unable to login to an application and may exceed a predetermined threshold for the number of failed login attempts. However, if access to the application is problematic for every user that tries to access that application, then the predetermined threshold for the number of failed login attempts may be revised to an arbitrary value. For example, the threshold may be revised to a number as high as 1000, 10000, $1 \times 10^{16}$ (near infinity), etc. In one exemplary embodiment, the threshold may be modified by a machine learning model which may detect the behavior of the failed login across several users for that application/system.

In another exemplary embodiment, a triangulation method may be used to reduce false positives. In a triangulation method, two points of view may be used to validate an initially produced risk score. For example, the first point of view may be at a user level with only that user's failed logins. This may be triangulated with one or more applications and/or system's failed login events of multiple users. In this example, an application's password system may not be functioning or may be experiencing issues or the enterprise password system may not be functioning or may be experiencing. In these cases, associating a higher risk score for the user may be incorrect. Thus triangulation may ensure that system 200 does not unnecessarily generate risk scores based on the number of failed login attempts to that user, application, or a system (e.g. servers, devices, etc.).

Additional examples of prime attributes associated with an entity (e.g., person) may include location of entity (e.g., city, state, country), job code, start and end dates (e.g., of an employee), employee status (active, terminated, on leave, suspended, etc.), a current risk score indicating a level of risk associated with the employee, work hours, work time zone, etc. By way of another example, prime attributes associated with an entity such as an account may include account type (e.g., individual, service, administrator, etc.), account status (e.g., active, inactive, etc.), account activation and/or deactivation dates, account usage, time of last login, time of last password change, number of times password has been changed, password expiration date, number of times it was not possible to login to the account, a current risk score associated with the account, etc. By way of yet another example, prime attributes associated with an entity such as an application may include application status (active, inactive, etc.), application usage frequency, importance or category of application (e.g., unrestricted, restricted, sensitive, confidential, etc.), type of employee or job codes that access and/or use the application, departments and/or locations that access and use the application, etc. As another example, prime attributes associated with an entitlement may include entitlement status (active, inactive, etc.), entitlement usage (e.g., view, create, update, delete, etc.), entitlement age, entitlement availability (e.g., assigned by native applications, or by another entity).

In some embodiments, system 200 may be configured to ingest/manage data, organization controls, rules, and/or one or more machine learning models to provide risk evaluations. For example, system 200 may be configured to ingest (e.g., access, read, or receive) data from various sources, learn/update one or more machine learning models based on the ingested data, generate initial risk scores using the one or more machine learning models, ingest organization controls and generate rules that may help system 200 generate risk scores by continuously detecting violations, ingest rules based on use cases, and known and un-known attack patterns to generate risk scores, ingest risk scores produced by external systems (e.g., systems such as Splunk, Qradar or any SIEM tool), and provide a consolidated and prioritized risk score. System 200 may also provide a remedy based on the generated risk score, perform remediation orchestration, and simultaneously learn the remediation actions based on the determined risk scores. Orchestration may include integrating different products (both security related and non-security related) and automating tasks across products through workflows, while also allowing for end user oversight and interaction. Thus, for example, risk orchestration may allow for an exchange of risk scores generated by system 200 and risks generated by other products. Further, the risk scores may be traced back to the source that produced the risk source. Thus, risk orchestration may include traceability of risk scores and ability to exchange risk scores. Remediation orchestration may include integrating system 200 with other products that allow for automating remediation tasks. Additionally, remediation orchestration may include managing the status of the remediation actions and escalating the status when the remediation actions are either not performed or are incomplete.

System 200 may include source systems 210, data transformation system 220, data management system 230, detection system 240, visualization system 260, remediation system 270, and/or target systems 280. One or more source systems 210 may be configured to provide data to system 200. Source systems 210 may include for example, computer systems associated with one or more, servers (Unix, windows, etc.), applications (e.g., SaaS, Database, Ldap, Splunk, Qradar, etc.), file systems, etc. Source systems 210 may provide entity data (e.g., including identity, account, application, entitlement, etc.) and event data (e.g., attributes associated with actions performed by an entity on one or more computer systems and/or applications). Source systems 210 may provide data in raw or as-is format from, for example, logs (authentication logs, access logs, syslogs), web logs, databases, enterprise resource planning (ERP) sites, social media, and any other third-party data. In some exemplary embodiments, source systems 210 may additionally or alternatively provide organization controls and entity risk scores generated by external systems. For example, risk scores may be imported from SIEM tools. In some exemplary embodiments, system 200 may be configured to connect directly to source systems 210, access raw data in source systems 210, and store the data in one or more storage devices associated with system 200. The stored raw data may then be converted using data transformation system 220, as will be explained below, and the transformed data may also be stored in the one or more storage devices associated with system 200. In other exemplary embodiments, system 200 may be configured to access data in source systems 210, transform the data on the fly, using data transformation system 220 as will be explained below, and store only the transformed data in one or more storage devices associated with system 200.

Data transformation system 220 may be configured to process data received from source systems 210. Data transformation system 220 may include data acquisition system 222 and data processing system 224. Data acquisition system 222 may be configured to retrieve data from source systems 210 and store the retrieved data into a data storage (e.g., memory, database, data structure, etc.). In some exemplary embodiments, the data storage used by data acquisition and transformation system 220 may be known as a data lake. Data acquisition system 222 may use different methods to retrieve data from source systems 210 by building and/or configuring data connectors or adaptors. In some exemplary embodiments, data acquisition system 222 may use connectors such as REST (Representational State Transfer) API, Database, LDAP, file, Splunk, etc. It is also contemplated that in some exemplary embodiments, data acquisition system 222 may be configured to process data directly from a data store already being used by an organization instead of storing all the input data in a separate data lake. Doing so may minimize the required amount of storage space by utilizing storage already available to the organization without requiring additional storage for a new data lake.

In some embodiments, data acquisition system 222 may be configured to operate using native connectors or use streaming pipelines to retrieve data from source systems 210. Such pipelines may be embedded in data acquisition system 222 and may be configured to work with batch and streaming data acquired from the source systems 210. Such pipelines may include built-in data readers and data writers for a variety of data sources and formats, and stream operators to transform data in-flight (e.g., as the data is being received into data transformation system 220 from source systems 210).

The exemplary disclosed pipelines may provide several advantages. First, the disclosed pipelines may process large volumes of data in near real-time because the pipelines may view all data (static files or streaming data) as streaming. By treating all data as streaming data, the disclosed pipelines may break data into smaller units which may enable the pipelines to process data immediately, thereby increasing processing speed (e.g., by processing data immediately instead of waiting for batch processing). Breaking data into smaller units may also promote efficient use of available memory resources. For example, processing data in smaller block sizes may allow data acquisition system 222 to ingest datasets that may have a size that may be several orders of magnitude larger than a size of the memory available to data acquisition system 222. Thus the disclosed data acquisition system 222 may help improve the functioning of any computer system 100 used to implement data acquisition system 222 by improving processing speed and reducing an amount of memory required for operations of computer system 100.

In some exemplary embodiments, the disclosed pipelines may associate metadata with each individual record or field of data. For example, such metadata may include identity of a creator of the data, an origin of the data, any changes made on the data, and identification of any entities (e.g., users or applications) that may be allowed to access and/or process the data. By way of further example, metadata may also include special processing instructions. The disclosed pipelines may provide a further advantage by not imposing a particular structure on data, which may enable system 200 to go back in time to any point and access the ingested data in the data lake in its raw format.

Data processing system 224 may be configured to parse data stored in the data lake by data acquisition system 222, and curate and assemble the parsed data into a form that is easily accessible by detection system 240. Data processing system 224 may be configured to convert a format of the data stored in the data lake into a format compatible with detection system 240. Data processing system 224 may perform this conversion based on a predetermined system configuration. For example, data processing system may employ a schema defining a row for each record, with each row including columns for different fields. Thus, for example, data processing system 224 may store the parsed and curated data in the form of records containing tabular data with each row having the same schema and each field having a single value. By way of example, a schema used for each row may include a particular order in which attributes (profile or prime) for an entity may be listed in successive columns. It is contemplated that each field may alternatively include alpha-numeric or other types of information. In some embodiments, each field may include pointers or links to associated information. It is further contemplated that other schemas and formats compatible with risk evaluation system 230 may be employed by data risk evaluation system 230. In some exemplary embodiments, the records parsed by data processing system 224 may include hierarchical data in which each node may include multiple child nodes and the nodes may include single values, array values, etc. Typically, a role is a set of entitlements where individual role can be treated as a node As an example, entitlement entity may have parent and child nodes, where the child node inherits the properties from parent node.

Data management system 230 may include data storage system 232 and data archival system 234. Data storage system 232 may store the information ingested by data acquisition system 222 in the data lake in raw format (i.e. in the native format in which data is received from source systems 210). Data storage system may also be configured to receive formatted data from data processing system 224 and to store the formatted data. Data archival system 234 may store historical data, which may include data that may have been previously used by, for example, detection system 240 to generate risk scores. Data storage system 232 and data archival system 234 may employ one or more storage devices such as for example, memory 104, memory device 126, hard disk 120, and/or other databases or data structures associated with system 200.

Detection system 240 may be configured to determine an overall risk score for an entity based on entity metadata and/or event data processed by data transformation system 220. Event data may include data associated with, for example, an access event, an application event, a system event, or other types of events. An access event may include, for example, a user logging into an application and/or system. An access event may also include, for example, a change in an entitlement made by an entity or a change in an entitlement for an entity. Another example of access event may include downloading a file from system or application. An application or system event may be an event where an application and or a system (e.g. server or other device) may perform some action. By way of example, an application event may include an action performed by an application to remove user access. As another example, an application or system event may include an application and/or a system running out of memory, respectively.

Detection system 240 may include rule management module 242, risk scoring and normalization module 244, compliance module 246, machine learning module 248, and monitoring and reporting module 250. Rule management module 242 may include one or more governance rules and/or transactional Rules. Rule management module 242 may store the one or more governance and/or transactional rules in one or more of memories 104, 126, hard disk 120, and/or one or more external databases or data structures associated with computer system 100. Governance rules and transactional rules in rule management module 242 may be generated based on one or more controls included in an organization's control library. In some exemplary embodiments, these rules may also be derived based on known attack patterns. Known attack pattern may be categorized as "confirmed" or "yet to be confirmed" (Predictive) patterns. In some exemplary embodiments, confirmed patterns may get converted into rules whereas the "yet to be confirmed" patterns may be converted into rules only after the attack patterns have been validated and/or confirmed. In some embodiments, the rules in rule management module 242 may be created based on responses provided to, for example, a survey questionnaire. Rule management module 242 may include rules that may detect an anomaly based on one or more prime attributes associated with an entity. In some exemplary embodiments, the rule may mark one or more entity types as anomalous. For example, a person may have left an organization but may still be able to successfully access an application and or system in the organization. An exemplary rule may require marking the associated account and the application/system as anomalous. In some exemplary embodiment's rules may have weights that may be used by risk scoring and normalization module 244. These weights may be used to determine a risk score of impacted entities. Weights may be assigned at the time of rule creation and may be adjusted as needed by the organization. In some embodiments, one or more rules may be flagged as active or in-active depending on the organization's requirement, Entity anomalies may be detected based on active rules in the system.

Risk scoring and normalization modular 244 may be configured to generate risk score for an entity. A risk score may include a numerical representation of a level of risk associated with an entity. Risk score may be any initial value or a numerical value starting from 0 (zero). For example, a risk score of a 0 may represent a low level of risk whereas a risk score of 100 may represent a high level of risk. Other numerical values or ranges of values may be used to represent a risk score and an associated level of risk.

Risk scoring and normalization module 244 may be configured to determine an initial risk score associated with an entity. The initial risk score may be assigned manually or automatically based on, for example, profile attributes associated with an entity. Every entity may be assigned an initial risk score. In addition, Risk scoring and normalization module 244 may determine a rule-based risk score (e.g. governance-rule-based risk score) based on a state of the entity determined using governance rules. Governance rules may include rules for whether particular accounts, applications, and/or entitlements may be accessed by an entity depending on the state of the entity. Thus, governance rules may represent authorization risks (e.g., risk associated with authorization provided to an entity). For example, the governance policies of an organization may determine whether or not an entity (e.g., employee) may access an application or account based on a prime attribute, such as, current state of an employee (e.g., active, terminated, on leave, etc.). Risk scoring and normalization module may generate a governance-rule-based risk score for an entity based on one or more attributes of that entity (entity attributes) and/or one or more attributes associated with an event (e.g. event attributes representing actions taken by that entity). Risk scoring and normalization model 244 may generate a static risk score based on a combination of an initial risk score and a governance rule-based risk score.

In some embodiments, a governance-rule-based risk score based on a rule may be a Boolean value (e.g., 1 or 0). For example, consider a governance rule, specifying that an employee who has been terminated is prohibited from accessing a particular account. Here, the entity attribute may be a value representing the terminated status of the employee. Thus, here the governance rule specifies, for example, that when the entity attribute is "1," and the terminated employee attempts to access that particular account (creating an authorization risk), the Boolean value result of the governance rule is 1. Thus, in this case, the governance-rule-based risk score may be 1. If on the other hand, the employee is not terminated and has an entity attributes (e.g. 0), the governance-rule-based risk score associated with that employee and or account may be 0.

By way of another example, consider a governance rule that specifies that an employee on a leave of absence may not access an application. When an employee on a leave of absence from the organization attempts to access that application (creating an authorization risk), the Boolean value result of the governance rule may be 1. Thus, in this case, the second governance-rule-based risk score may be 1. If on the other hand, the employee does not attempt to access the application, the second governance-rule-based risk score associated with that employee and or application may be 0. Here, the entity attribute may be a value representing the employee's status as being on leave. By way of yet another example, consider a governance rule specifying that a contractor must be associated with a termination date. In this case, when risk scoring and normalization module 244 determines that an entity is a contractor and has no termination date associated with that entity, risk scoring and normalization module 244 may assign a Boolean value result of the governance rule as 1. On the other hand, if an entity is identified as a contractor and has an associated termination date, the Boolean value result of the governance rule may be 0. It is contemplated that other numerical values (e.g., 100, 0) may be used instead of the Boolean values (1,0), respectively. Although examples of governance rules have been provided in this disclosure, it is to be understood that many other types of governance rules may be implemented by system 200.

In some exemplary embodiments, risk scoring and normalization module 244 may additionally or alternatively generate a transaction-rule-based risk score for an entity and/or access event based on transactional rules. One or more of entities such as identity, account, application, system and/or entitlement may constitute one or more risks for an access event. Risk scoring and normalization module 244 may determine one or more transactional rule-based scores for an entity based on transaction data. For example, risk scoring and normalization module 244 may determine a transactional rule risk score based on events related to application accesses, failed logins, multiple successful/unsuccessful password change attempts, or by targeted identities (such as terminated or deactivated identities). Such a transactional rule-based risk score may represent an authentication risk or an authorization risk.

By way of example, rule management system 242 of detection system 240 may include transactional rules for determining transaction-rule-based risk scores. The transaction rules in rule management system 242 may be stored in one or more of memories 104, 126, hard disk 120, and/or one or more external databases or data structures associated with computer system 100. A transaction rule may determine a transaction-rule-based risk score based on one or more transactions (e.g., activities such as access and/or modification of an account, application, or entitlement) performed by an entity. In some embodiments, one or more prime attributes may have thresholds and transactional rules may define thresholds associated with the prime attributes and associated risk scores. By way of example, a transaction rule may define a threshold for failed login attempts and its associated risk score. The threshold may qualify as an event attribute associated with, for example, a login event. Thus, for example, a transaction-rule-based risk score of 30 may be assigned when the number of failed login attempts exceeds a threshold of 3, whereas a transaction-rule-based risk score of 70 may be assigned when the number of failed login attempts exceeds 10. As another example, a transaction rule may define risk scores based on a number of login attempts or access attempts after work hours that exceed predetermined thresholds. By way of another example, a transaction rule may define risk scores for an employee accessing a particular application or account while being located in a particular geography (e.g., country, city, locality, etc.). As yet another example, when an entity (e.g., employee) on leave accesses his account or an application once per day, a transaction rules may specify a relatively low risk score (e.g., 30) for that employee. However, when the employee on leave accesses his account or an application ten times per day, the transaction rules may, for example, specify a relatively high risk score (e.g., 70) for that employee. Here the employee status as being on leave may be represented by an entity attribute and a number of access attempts may be an event attribute. Thus, this transactional rule may employ both the entity attribute and the event attribute to determine the transactional rule-based risk score. Many other transaction rules, thresholds, and associated risk scores may be defined in rule management module 242 based on the prime attributes of an entity and any actions that the entity may take. It is contemplated that one or more new governance and/or transaction rules may be added to rule management module 242, or one or more governance and/or transaction rules in rule management module 242 may be modified, deleted, and/or combined, either manually by a user or by system 200 automatically. Although governance and transaction rules have been discussed above, it is contemplated that rule management module 242 may include other types of rules, which may be used by risk scoring and normalization module 244 to generate rule-based risk scores.

When more than one governance or transactional rule applies to an entity and/or access event, risk scoring and normalization module 244 may determine rule based risk scores (e.g. governance-rule-based risk scores, transaction-rule-based risk scores, etc.) corresponding to each of the rules. Risk scoring and normalization module 244 may combine all the governance-rule-based risk scores into an overall governance-rule-based risk score. Similarly, risk scoring and normalization module 244 may combine all the transactional-rule-based risk scores into an overall transactional-rule-based risk score. In some embodiments, risk scoring and normalization module 244 may determine an overall governance or transactional rule-based risk score as a mean value of all the respective governance or transactional rule-based risk scores. It is contemplated, however, that risk scoring and normalization module 244 may determine the overall governance or transactional rule-based risk score using other mathematical operations (e.g., sum, maximum value, minimum value, median value, etc.) or other algorithms.

In some embodiments, risk scoring and normalization module 244 may generate the governance or transactional rule-based risk scores using machine learning module 248. Machine learning module 248 may include one or more analytics modules or machine learning models that may use unsupervised machine learning techniques (e.g., clustering, anomaly detection, etc.) for analyzing data in real-time to build predictive and cognitive models. The one or more analytics modules or machine learning models may process large amounts of event data (e.g., access data, authorization and entitlement data, data associated with actions taken by one or more entities, etc.) present in application, IAM logs, and/or system logs and detects unusual (e.g., anomalous) behaviors patterns. The one or more analytics modules or machine learning models may be trained using self-learning analytics, predictive analysis, and/or anomaly detection techniques that monitor activity across various application assets and near real-time log streams. Based on the data received from, for example, data processing system 222, the one or more analytics modules or machine learning models may detect anomalies in access request traffic and identity data flows, while also recognizing "normal activities," thus minimizing false-positive alerts. Risk scoring and normalization module 244 may leverage an external risk definition data-store in order to continually enhance one or more analytics modules or machine learning models with insights gained from data contributed by external risk actors. It is also contemplated that in some exemplary embodiments, a different analytics module or machine learning model may be implemented and trained based on each of governance rules, transactional rules, and/or event data.

By way of example, an analytics module or machine learning model may determine that an entity is accessing an account or application after work hours although that entity has not previously accessed that account or application after work hours. By way of another example, an analytics module or machine learning model may determine that an entity is copying data from a particular application every day to an external device. As yet another example, an analytics module or machine learning model may determine that an entity attempts to access a particular application at a particular time during the day or week. The analytics module for machine learning model may identify the attempts to access event as abnormal.

The analytics module or machine learning model may also identify such abnormal behavior patterns, which in turn may be converted to governance and/or transaction rules. Thus, for example, the one or more analytics modules or machine learning models may generate one or more governance and/or transactional rules based on the un-supervised learning techniques. The governance and/or transactional rule generated by the one or more analytics modules or machine learning models may be added to the rules already stored in rule management model 242. As discussed above, risk scoring and normalization model 244 may determine one or more rule-based scores using the rules generated by machine learning model 248 in addition to or separately from the other rules stored in rule management model 242.

In other exemplary embodiments, machine learning module 248 may instead generate the governance or transactional rule-based scores directly without first generating governance or transactional rules. For example, machine learning module 248 may employ Lasso, Ridge, Elastic, or other types of neural networks to train one or more machine learning models to determine a rule-based risk score based on prime attributes associated with various entities and weights assigned to the prime attributes. Machine learning module 248 may employ training data based on some or all of the governance and transactional rules in rule management module 242, their associated risk scores, and weights assigned to various rules and/or risk scores to train machine learning model 248. In some embodiments, risk scoring and normalization module 244 may apply one or more of the governance or transactional rules in rule management module 242 for a predetermined number of occurrences (e.g., 100 times or 200 times) or for a predetermined amount of time (e.g., 5 days or 10 days) for training the one or more machine learning models in machine learning module 248. Once the one or more machine learning models has been trained using the governance and/or transactional rules, risk scoring and normalization module 244 may use machine learning module 248, instead of the governance and transactional rules used to train the one or more machine learning models to generate rule-based risk scores for one or more entities and/or access events.

As discussed above, it will be understood that some or all governance and/or transactional rules may be used to train machine learning module 248. Rule management module 242 may maintain traceability of rules already converted to machine learning model. For example, when only a subset of rules are used to train machine learning module 248, rule management module 242 may identify that subset of rules by a flag or marker to indicate that those rules have already been used to train one or more machine learning models for generating rule-based risk scores using that subset of rules.

By way of example, a rule that may have been used to train the one or more machine learning models may have a flag of "1" whereas a rule that has not been used to train the machine learning model may have a flag of "0." Risk scoring and normalization model 244 may continue to use rules not included in the subset to generate rule-based risk scores. In this case, for example, the scores generated by the machine learning module 248 and scores generated based on rules not included in the training subset may be combined to generate a combined rule-based risk score.

Once scored, every entity (e.g., identity, account, entitlement, system and/or application) and every access event may have an initial risk score and/or a rule-based risk score. Risk scoring and normalization module 244 may generate an overall risk score for every entity and/or access event by combining the initial and rule-based risk scores. For example, risk scoring and normalization module 244 may generate a static risk score by combining an initial risk score and one or more governance-rule-based scores for an entity. Risk and normalization model 244 may also generate a dynamic risk score for an entity by combining one or more transactional-rule-based risk scores. And, risk scoring and normalization module 244 may generate an overall risk score for an entity by combining the static and dynamic risk score for that entity. In some embodiments, risk scoring and normalization module 244 may combine risk scores by using a mean value of risk scores. It is contemplated, however, that risk scoring and normalization module 244 may combine the risk scores using other mathematical operations (e.g., sum, maximum value, minimum value, median value, etc.) or other algorithms.

It is contemplated that detection system 240 may generate an overall risk score based on combinations of one or more of selected ones of the initial risk scores, rule-based risk scores, and/or dynamic risk scores. Thus, for example, in some exemplary embodiments, an overall risk score for an entity may be a static risk score based on an initial risk score and one or more governance-rule-based risk scores. In other exemplary embodiments, an overall risk score for an entity may be based on an initial risk score and one or more dynamic risk scores. In yet other exemplary embodiments, an overall risk score for an entity may be based on one or more governance-rule-based risk scores and one or more dynamic risk scores. In yet other exemplary embodiments, the overall risk score may include all three types of risk scores, namely, initial risk scores, governance-rule-based risk scores, and transactional-rule-based risk scores.

As discussed above, risk scoring and normalization module 244 may generate risk scores. Alternatively, system 200 may ingest risk scores produced by other risk producing source systems. The risk scores generated by risk scoring and normalization module 244 and the risk scores produced by external scoring systems may, however, be different in scale. For example, risk scoring and normalization module 244 may produce risks that may range between values of 0 and 1. Other external risk scoring systems may produce risk scores that may range, for example, in value from 0 to 100. Risk scoring and normalization module 244 may normalize the risk scores (e.g. scale them to the same range) to allow the scores to be exchanged and/or combined. In some exemplary embodiments, risk scoring and normalization module 244 may combine the normalized scores generated by risk scoring and normalization module 244 with the normalized externally receive risk score. Doing so may produce a singular view of entity risks, which may allow an enterprise to continuously evaluate, govern and remediate such risks. Although the above discussion as focused on generating risk scores for an entity, the same techniques may be used to generate risk scores for one or more events.

Detection system 240 may include compliance module 246 that may manage organizational controls. As stated above, the organizational controls imported into rule management module 242 are used for defining governance and/or transactional rules. Rule management module 242 may also maintain an association of controls to rules. Compliance module 246 may continuously evaluate whether an organization's controls are working by evaluating the rules stored in rule management module 242. The controls may be associated to industry standard regulations such as SOX, HIPAA, GLBA, FERPA, CCPA, etc. For example, an organization may have a control set on password length using which a rule may be generated to check password length of accounts on applications and/or systems. Risk scoring and normalizing module 244 may execute this rule and generate risk scores for impacted entities.

Monitoring and reporting module 250 may be configured to continuously receive information provided from risk scoring and normalization module 244, machine learning module 248 and remediation module 272 and provide a report to user device 136. The report may be in the form of an email, a text message, incident record or in the form of a document which may be transmitted to user device 136. It may be configured to deliver one or more reports to individual or group of people. Application owners, systems owners, etc. may subscribe to these reports to periodically evaluate the risks and remediation actions associated with their applications and or systems. In some exemplary embodiments, the risk score for an entity or access event may be classified into a risk type (low, medium, high, excessive, etc.) based on the risk score (or risk rating) by monitoring and reporting module 250. In one exemplary embodiment, an active risk score of less than or equal to, for example, 29 may correspond to a low risk type, an active risk score of between 30 and 59 may correspond to a medium risk type, an active risk score of between 60 and 89 may correspond to a high risk type, and an active risk score of 90 or higher may correspond to an excessive risk type. Other risk classifications and associated ranges of risk scores are also contemplated.

Visualization system 260 may include visualization module 262 that may be configured to render information ready for presentation and manipulation. Visualization module 262 may employ any components or subsystems appropriate for user interface generation, such as JavaScript, Angular, etc. In one exemplary embodiment, visualization module 262 may generate one or more icons to display the risk score and risk type determined by risk scoring and normalization module 244, machine learning module 248, and/or monitoring and reporting module 250. For example, the icon may include a bar having a length based on a magnitude of the risk score and a color based on the associated risk type. In one exemplary embodiment, the icon may be displayed in red color for high and excessive risk, in amber or yellow for medium risk, and in green for low risk. Icons generated by visualization module 262 may be displayed, for example on user device 136, on a display device associated with computer system 100, and/or may be incorporated in reports generated by reporting and monitoring module 250. Other types of graphical icons and representations are also contemplated. It is also contemplated that detection system 240 may be provided as an application programming interface (API, e.g., RestAPI) configured to generate the initial, static, dynamic, and/or overall risk scores, which in turn may be associated with various graphical dashboards or user interfaces for displaying and visualizing the risk scores and risk types determined by detection system 240. Likewise, remediation module 272 may provide one or more remediation actions that may also be displayed by visualization module 262.

It is contemplated that in some exemplary embodiments, a user may request an overall risk score for one or more entities. For example, a user may request the overall risk score using a user device 136 (e.g., computer, laptop, tablet, phone, etc.). Device 136 may send a request to system 200 for the overall risk score. In response, system 200 may either generate the overall risk score for the one or more entities or retrieve previously generated overall risk scores associated with the one or more entities from one or more of memories 104, 126, hard disk 120 or an external database or data structure. Visualization module 262 may generate an icon or other visual representations of the one or more overall risk scores and transmit the scores and/or visual representations to user device 136. A user interface on user device 136 may display the overall risk scores and/or the associated visual representations.

System 200 may continuously ingest data from source systems 210 and generate or update risk scores for every entity. It is assumed that as events are acquired from applications, the algorithm may look for the risk scoring attributes, for example, IP addresses, a location, a department, a user type, and an application access entitlement, etc. to determine and generate/update the user risk score. Similarly, if rule management module 242 is modified by adding, deleting, or modifying one or more governance, transaction, or other rules, detection system 240 may apply the rules from the modified rule management module 242 for determining the rule-based scores. Additionally or alternatively, detection system 240 may retrain one or more machine learning models in machine learning module 248 based on any changes to the governance and/or transactional rules in rule management module 242 and use the retrained machine learning models to determine rule-based risk scores.

One or more components/modules of system 200 may be implemented using, for example, system 100 in FIG. 1. By way of example one or more modules of systems 210, 220, 230, 240, 260, and/or 270 may be implemented in the form of software instructions executed by one or more processors 102 to perform the above-described functions. The instructions may be stored in one or more of memories 104, 126, hard disk 120, and/or one of more external databases or data structures. In some exemplary embodiments, the instructions for implementing the one or more components or modules of system 200 may also be stored on remote servers accessible via network 128. By way of another example, one or more of components/modules of system 200 may be implemented using a specially programmed processor 102 configured to execute instructions to perform functions specific to the respective component or module.

Remediation system 270 may include remediation module 272 and machine learning module 274. Remediation module 272 may receive prioritized initial risk scores, rule-based risk scores, dynamic risk scores, and/or overall risk scores from risk scoring and normalization module 244. Remediation module 272 may analyze the risk scores, for example, to identify candidate risk scores that may be greater than predetermined thresholds. In some exemplary embodiments, remediation module 272 may determine, for example, a percentage contribution of each of the initial risk scores, rule-based risk scores, and dynamic risk scores, to the overall risk score, and identify the type of risk score that has a highest contribution to the overall risk score. In addition remediation module 272 may receive rules from rule management module 242 with the required remediation action to be performed, Based on this determination, remediation module may present one or more remediation actions for reducing the entity risk score (e.g. initial risk score, and/or rule-based risk score, or dynamic risk scores) and/or for reducing the overall risk score.

By way of example, when a rule-based risk score for an entity (e.g. user) is high because the user is attempting to log in during hours outside of the user's normal login hours and/or from locations outside of the user's normal login locations, remediation module 272 may generate a remediation action in the form of an alert (e.g. email, text, etc.) sent to a supervisor of the user regarding the user's activities. By way of another example, a remediation action may include recommendations to disable user's login access, warn the user, or modify user's access privileges to permit the user to log in outside of normal hours or from normal locations, etc.

It is contemplated that remediation module 272 may include one or more remediation rules that may specify remediation actions based on one or more of the initial risk scores, rule-based risk scores, and/or overall risk scores. In some exemplary embodiments, the rules specifying remediation actions may also be stored in rule management module 242. Remediation module 272 may identify one or more remediation actions based on the remediation rules. In some exemplary embodiments, the remediation rules may be ingested along with other information from source systems 210. In other exemplary embodiments, remediation rules may be received by remediation module 272 as input from a user of system 200. It is contemplated that one or more remediation rules in remediation module 272 may be added, deleted, modified, and/or combined with other remediation rules.

In some exemplary embodiments, remediation module 272 may be configured to train one or more machine learning models in machine learning module 274. For example, remediation module 272 may receive user inputs regarding remediation actions taken in response to particular initial risk scores, rule-based risk scores, dynamic risk scores, and/or overall risk scores. Remediation module 272 may train the one or more machine learning models in machine learning module 274 based on the user inputs. It is also contemplated that remediation module 272 may retrieve one or more training data sets from the one or more storage devices 104, 120, 126, etc., that may relate one or more remediation rules and one or more of initial risk scores, rule-based risk scores, dynamic risk scores, and/or overall risk scores to one or more remediation actions. Remediation module 272 may be configured to extract weights associated with the one or more risk scores, the one or more remediation rules, and/or the one or more remediation actions. Remediation module 272 may be configured to train one or more machine learning models in machine learning module 274 using the training data sets and the extracted weights. Remediation module 272 may use one or more of techniques discussed above in connection with machine learning module 248 to train the one or more machine learning models in machine learning module 274. Remediation module 272 may determine one or more remediation actions based on the one or more trained machine learning models.

It is contemplated that the remediation actions generated by remediation system 270 may additionally or alternatively be stored in data storage system 232 or data archival system 234. Additionally or alternatively, target systems may subscribe to a remediation service provided by the system. For example, a target system 280 may specify a preference for automatically receiving one or more risk scores and/or remediation actions associated with those risk scores. Based on such subscription, remediation actions generated by remediation system 270 may be transmitted automatically to one or more target systems 280. Target systems 280 may include one or more user devices 136, and/or source systems 210. In addition the remediation system may maintain the lifecycle of remediation tasks, any unactioned and/or timed out remediations can be escalated to desired process owners.

In some embodiments, one or more components of system 200 may be realized as a microservice. For example, at least one of source systems 210, data transformation system 220, data management system 230, detection system 240, visualization system 260, and/or remediation system 270 may be implemented as a microservice. Microservices model may arrange components of application as loosely coupled services.

Figure 3:
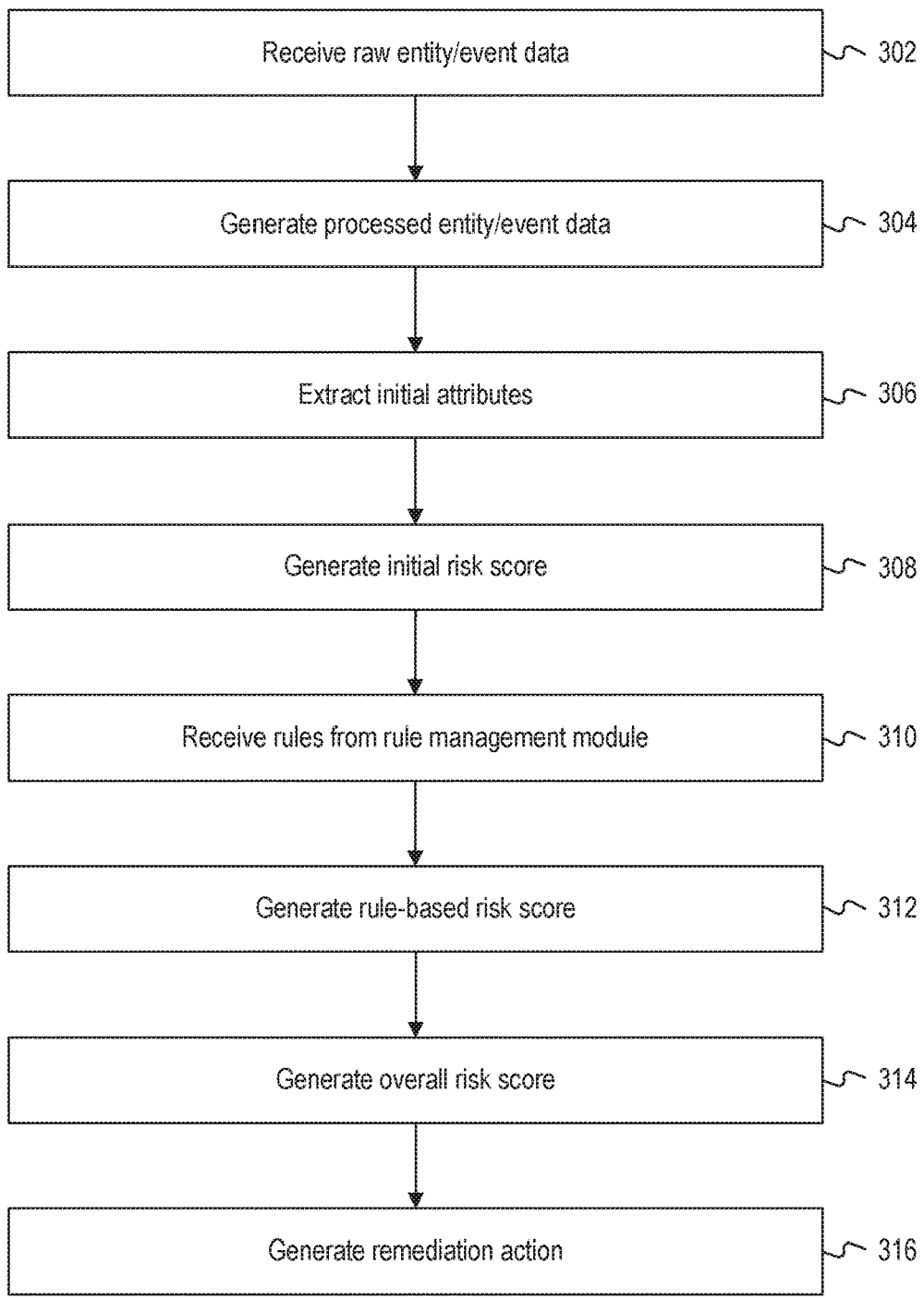
FIG. 3 depicts an exemplary flow chart of an exemplary process for generating and managing risk scores, consistent with disclosed embodiments.

FIG. 3 depicts an exemplary flow chart illustrating an exemplary cyber security risk monitoring and remediation process 300, consistent with disclosed embodiments. In some embodiments, process 300 may be executed by system 200. For example, one or more processors 102 may access instructions stored in one or more of memories 104, 126, and/or in an external storage (e.g., database or data structure) and execute those instructions to implement one or more components/modules of system 200 and perform the functions associated with the respective components/modules of system 200. The order and arrangement of steps of method 300 is provided for purposes of illustration. As will be appreciated from this disclosure, modifications may be made to method 300 by, for example, adding, combining, removing, and/or rearranging the steps of method 300.

Process 300 may include a step of receiving raw entity and/or event data (Step 302). In step 302, one or more processors 102 implementing data acquisition system 222 of system 200 may receive raw entity and/or event data including data associated with one or more of a plurality of entities and/or events, profile and prime attributes associated with the entities, and attributes associated with the events etc. The one or more processors 102 may receive and ingest data in its raw or native format from one or more source systems 210. The one or more processors 102 implementing data storage system 222 may cause the raw entity and/or event data to be stored in a data storage or data lake, for example, in one or more of memories 104, 126, hard disk 120, and/or an external storage (e.g., database or data structure). It is contemplated that in some exemplary embodiments, the one or more processors 102 may read all the data in the data lake and only store the required information in data storage system 232

Process 300 may include a step of generating processed entity and/or event data (Step 304). In step 304, one or more processors 102 implementing data processing system 224 of management system 200 may convert the raw entity and/or event data into processed entity or event data having a format compatible with detection system 240. For example, the one or more processors 102 may convert raw entity and/or event data stored in the data lake into processed entity data using a predetermined schema. As discussed above, in one exemplary embodiment, processed entity and/or event data may be in the form of records (e.g., rows), each row having a plurality of columns or fields that include a value or other information associated with a respective field. For example, each attribute associated with an entity and/or event may be included in a separate column in the row corresponding to that entity in the processed entity or event data. The one or more processors 102 implementing data storage system 222 may cause the processed entity and/or event data to be stored for example, in one or more of memories 104, 126, hard disk 120, and/or an external storage (e.g., database or data structure).

Process 300 may include a step of extracting initial attributes for the plurality of entities and/or events (Step 306). In step 306, monitoring system 200 may extract initial attributes corresponding to the initial attributes from the processed entity and/or event data. As discussed above, the raw entity or event data received by data acquisition system 221 may include one or more attributes for one or more entities and/or events. As also discussed above, processed entity or event data generated by data processing system 223 may also include the attributes associated with the one or more entities and/or events. In step 306, one or more processors implementing monitoring system 200 may read, segregate, identify, and/or flag the attributes associated with the one or more entities and/or in the second entity data.

Process 300 may include a step of generating initial risk score(s) for one or more entities (Step 308). For example, one or more processors 102 implementing risk scoring and normalization module 244 of system 200 may select an entity from the plurality of entities included in the raw and/or processed data. In some exemplary embodiments, the one or more processors 102 may receive an initial risk score for the selected entity from a user, for example, via input device 132. In other exemplary embodiments, the initial risk score for the selected entity may be included in the raw and/or processed entity data. In yet other exemplary embodiments, the one or more processors 102 may generate the initial risk score for the selected entity based on at least one initial attribute associated with the selected entity. Thus, for example, as described above with respect to risk scoring and normalization module 244, based on an initial attribute such as a job description of an entity (e.g., janitor, manager), processor 102 may assign an initial risk score to the selected entity. It is contemplated that processor 102 may repeat the process of generating initial risk scores by selecting each entity and/or event in the second entity data and generating an initial risk score for each selected entity and/or event. It is further contemplated that additionally or alternatively, processor 102 may assign an initial risk score to one or more remaining entities based on an input of the initial risk score received for one or more of the entities. By way of example, the one or more processors may receive an initial risk score for an entity (e.g. user in a particular department) as an input. The one or more processors may then be configured to assign that initial risk score to other user entities associated with that particular department. The one or more processors 102 may store the initial risk scores for the entities and/or events in one or more of memories 104, 126, hard disk 120, and/or an external storage (e.g., database or data structure).

Process 300 may include a step of receiving responses for a questionnaire from the enterprise that helps in understanding the operation posture of organization. In addition it helps a person to assign weights to attributes and assigning initial risk score to one or more entities. It is contemplated that processor 102 may store instructions and generate the initial risk score for other entities based on the attributes associated with the selected entity. Thus, for example, as described above with respect to risk scoring and normalization module 244, based on attributes such as a job code, cost center, department of an entity (e.g., janitor, manager), processor 102 may assign an initial risk score to the selected entity. The one or more processors 102 may store the initial risk scores for the entities in one or more of memories 104, 126, hard disk 120, and/or an external storage (e.g., database or data structure).

Process 300 may include a step of receiving one or more rules from rule management module 242 (Step 310). In step 310, one or more processors 102 implementing risk scoring and normalization module 242 may access one or more of memories 104, 126, hard disk 120, and/or an external storage (e.g., database or data structure) storing rule management module 242. The one or more processors 102 may access (e.g., read) one or more governance or transactional rules. The one or more processors 102 may also access information including weights associated with the one or more governance or transactional rules. In addition, the one or more processors 102 may access instructions regarding determining a rule-based risk score for an entity based on at least one initial attribute associated with an entity or event.

Process 300 may include a step of generating a rule-based risk score for a selected entity and/or event based on at least one governance or transactional rule (Step 312). In step 312, the one or more processors 102 implementing risk scoring and normalization module 244 may apply one or more of the governance and/or transactional rules to determine a rule-based risk score based on at least one initial attribute associated with the selected entity and/or event. As discussed above with respect to risk scoring and normalization module 244, the one or more processors 102 may determine a single rule-based risk score or a plurality of rule-based risk scores for the selected entity and/or event. The one or more processor 102 may combine the plurality of rule-based risk scores to generate an overall governance-rule-based risk score and/or an overall transactional-rule-based risk score for the selected entity in the manner described above with respect to risk scoring and normalization module 244.

As also discussed above with respect to risk scoring and normalization module 244, it is contemplated that in some exemplary embodiments, the one or more processors 102 may train one or more analytics modules or machine learning models in machine learning module 248 using the one or more governance and/or transactional rules, attributes associated with the one or more entities, and risk weights associated with the attributes and/or the one or more governance and/or transactional rules. The one or more processors 102 may use the trained machine learning models to generate a rule-based risk score for the selected entity. In some exemplary embodiments, risk scoring and normalization module 244 may generate one or more governance and/or transactional rules using the trained machine learning models and then generate one or more rule-based course using the generated governance and/or transactional rules. In other exemplary embodiments, risk scoring and normalization module 244 may generate the rule-based risk scores directly using the trained machine learning models without first generating rules using the machine learning models. It is contemplated that processor 102 may repeat the process of generating rule-based risk scores by selecting each of the entities in the processed entity data and/or event data and generating a rule-based risk score for each selected entity. The one or more processors 102 may store the rule-based risk scores for the entities in one or more of memories 104, 126, hard disk 120, and/or an external storage (e.g., database or data structure).

Process 300 may include a step of generating an overall risk score for the selected entity (Step 314). In step 314, the one or more processors 102 may generate the overall risk score by combining some or all of the initial risk score (e.g., generated in step 308) and the rule-based risk score (e.g., generated in step 312). The one or more processors 102 may combine some or all of the initial, rule-based risk scores using one or more mathematical operations (e.g., maximum, minimum, sum, difference, mean, median, etc.) or other algorithms. It is contemplated that processor 102 may repeat the process of generating the overall risk score by selecting each of the entities-in the processed entity and/or event data and generating the overall risk score for each selected entity. In addition entity risk scores may be ingested and stored in the data lake. As discussed above, risk scoring and normalization module 244 may normalize the ingested and/or generated risk scores and combine the normalized scores for generating an overall risk score of an entity. The one or more processors 102 may store the overall risk scores for the entities in one or more of memories 104, 126, hard disk 120, and/or an external storage (e.g., database or data structure).

Process 300 may include a step of generating a remediation action (Step 316). In step 316, the one or more processors 102 may implement remediation module 272 and/or machine learning module 274 to generate one or more remediation actions based on one or more of initial risk scores, rule-based risk scores, and/or overall risk scores as discussed above with respect to remediation system 270.

It is contemplated that the one or more processors 102 may execute some or all of the steps of process 300 repetitively at predetermined intervals of time (e.g. every hour, every day, every week, every month, etc.). In some exemplary embodiments, the one or more processors 102 may additionally or alternatively execute some or all of the steps of process 300 in response to, for example, a user input. For example, in some exemplary embodiments, after completing process step 318, the one or more processors 102 may return to process step 302 to receive data from source systems 310 and repeat steps 302-318 of process 300. In other exemplary embodiments, the one or more processors 102 may repeat only some of the steps selected from steps 302-318 of process 300.

It will be apparent to those skilled in the art that various modifications and variations may be made to the disclosed system and related methods. Other embodiments will be apparent to those skilled in the art from consideration of the specification and practice of the disclosed system and related methods. It is intended that the specification and examples be considered as exemplary only.

What is claimed is:

1. A system for managing cyber security risks, comprising:
    one or more memory devices storing instructions; and
    one or more hardware processors configured to execute the instructions to perform operations comprising:
        receiving entity data comprising entity attributes associated with an entity, and receiving event data comprising event attributes associated with an entity transaction associated with a source system and undertaken or attempted by the entity;
        generating an initial risk score for the entity, the initial risk score being based on a static profile attribute of the entity attributes and not on the entity performing any particular action;
        receiving, from a rule management module, at least one governance rule, wherein the at least one governance rule is configured to determine a risk score related to the entity performing any entity transaction at least partially based on a prime attribute of the entity attributes, the prime attribute related to a status of the entity;
        receiving, from the rule management module, at least one transactional rule, wherein the at least one transactional rule is configured to determine a risk associated with an entity transaction based on the prime attribute and one or more of the event attributes;
        identifying patterns, using a machine learning model, that are generated based at least in part on the entity data and the entity transaction, wherein the patterns include anomalies and behavior associated with the entity attributes, the entity transaction, the source system, or a combination thereof;
        generating a rule-based risk score using at least one governance rule, the at least one transactional rule, the entity attributes, the patterns identified, and the event attributes; and
        generating an overall risk score for the entity based on the initial risk score and the rule-based risk score.

2. The system of claim 1, wherein the operations further include:
    training the machine learning model to generate the rule-based risk scores based on one or more of the entity attributes, the event attributes, or the rules; and
    generating the rule-based risk score for the entity based on the trained machine learning model.

3. The system of claim 2, wherein generating the rule-based risk score for the entity further includes:
    generating at least one transaction or governance rule using the machine learning model, wherein the at least one transaction or governance rule that is generated using the machine learning model was not predetermined; and
    generating the rule-based risk score using the at least one transaction or governance rule generated by the machine learning model.

4. The system of claim 2, wherein the operations further include training the machine learning model to generate the rule-based risk scores using a portion of the rules, and
    generating the rule-based risk score includes:
        generating a first rule-based risk score using the trained machine learning model;
        generating a second rule-based risk score using at least one rule selected from a remaining portion of the rules; and
        generating the rule-based risk score based on the first and second rule-based risk scores.

5. The system of claim 4, wherein the operations further include:
    assigning a flag to at least one rule in the portion of rules selected for training the machine learning model, the flag being configured to indicate that the at least one rule has been used to train the machine learning model; and
    storing the at least one rule in association with the flag.

6. The system of claim 2, wherein:
    training the machine learning model to generate the rule-based score comprises:
        using an unsupervised machine learning technique based at least partially on the pattern; and
    generating the rule-based risk score for the selected entity comprises generating the rule-based risk score based at least partially on the pattern and at least partially not based on predetermined rules.

7. The system of claim 1, wherein the at least one rule is a first rule selected from a first set of rules, the rule-based risk score is a first rule-based risk score, the rule management module includes a second set of rules, and the operations further include:

receiving, from the rule management module, a second rule from the second set of rules for determining a second rule-based risk score based on at least one action performed by at least one entity in a plurality of entities;

generating the second rule-based risk score for the at least one entity based on the second rule and an action performed by the selected entity; and generating the overall risk score for the at least one entity based on the initial risk score, the first rule-based risk score, and the second rule-based risk score.

8. The system of claim 7, wherein the first set of rules includes governance rules and the second set of rules include transactional rules.

9. The system of claim 1, wherein the event data comprises one or more actions performed by a plurality of entities, and the operations further include:

training a machine learning model, using the event data, to determine dynamic risk scores associated with the event attributes;

generating a dynamic risk score for the entity based on the trained machine learning model; and generating the overall risk score for the entity based on the initial risk score, the rule-based risk score, and the dynamic risk score.

10. The system of claim 9, wherein training the machine learning model includes determining the dynamic risk scores associated with the event data based on one of a predictive analysis or by detecting patterns in the event data.

11. The system of claim 1, wherein:

the prime attribute is selected from the group consisting of:
 a time-based status of the entity;
 a location-based status of the entity;
 a relationship status between the entity and the secured system;
 a role of the entity with an organization;
 a type of employment of the entity within an organization;
 an employment or contract start data of the entity with an organization; and
 an employment or contact end date of the entity with an organization; and the profile attribute is selected from the group consisting of:
 a personal identification;
 a name;
 an account identification;
 registration of a particular application; and
 entitlement identifier.

12. The system of claim 1, wherein the overall risk score is classified into a risk type selected from a plurality of risk types, including low risk, medium risk, and high risk.

13. The system of claim 12, wherein the overall risk score is one of a plurality of overall risk scores generated by the processor for a plurality of entities, each of the risk types includes sub-categories, and the operations further include, ranking the overall risk scores and associating the ranked overall risk scores with the sub-categories.

14. The system of claim 1, wherein the operations further include generating at least one remediation action based on at least one of the initial risk score, the rule-based risk score, or the overall risk score, wherein the at least one remediation action is selected from a plurality of possible remediation actions based on relative contributions of the initial risk score and the rule-based risk score.

15. The system of claim 14, wherein the operations further include:

predicting the at least one remediation action using a machine learning model that was trained to predict remediation actions based on training data including a set of remediation rules, a set of remediation actions, and a set of risk scores.

16. The system of claim 15, further including automatically transmitting the at least one remediation action to a target system that has subscribed to a remediation service.

17. The system of claim 15, wherein training the machine learning model comprises:

extracting weights associated with the one or more risk scores, the one or more remediation rules, and/or the one or more remediation actions; and training the machine learning model using the training data and the weights.

18. The system of claim 1, wherein the operations further include validating the overall risk score by triangulating using a machine learning model by calculating the overall risk score for the entity based on a series of events that are not specific to the entity, wherein triangulating comprises:

identifying a first pattern of risk associated with the entity and not any other entities;

identifying a second pattern of risk associated with a plurality of other entities; and comparing the first and second patterns of risk to determine whether the overall risk score is valid.

19. The system of claim 1, wherein the operations further include:

extracting an external overall risk score from entity data;
normalizing the external overall risk score; and
combining the normalized external overall risk score with the generated overall risk score.

20. The system of claim 1, wherein the prime attribute changes over time, and wherein the at least one governance rule is configured to determine the risk score at least partially based on a difference between the prime attribute at two different times.

21. The system of claim 1, wherein the entity attributes are configured to identify a particular entity, wherein the static profile attributes are entity attributes that do not change over time for a particular entity, and prime attributes are entity attributes that are able to change for a particular entity.

22. A system for managing cyber security risks, comprising:

one or more memory devices storing instructions; and
one or more hardware processors configured to execute the instructions to perform operations comprising:
 receiving raw entity data and raw event data associated with a plurality of entities having complex relationships with one another from a source system, wherein the raw entity data includes information regarding the entities and the raw event data includes information regarding one or more actions associated with one or more of the entities, wherein the one or more actions comprise an entity transaction event and wherein the complex relationships comprise one-one relationships, one-many relationships, and many-many relationships;
 converting the raw entity data to processed entity data having a format different from the raw entity data;
 converting the raw event data to processed event data having a format different from the raw event data;
 extracting entity attributes associated with the plurality of entities from the processed entity data, wherein the entity attributes include characteristics associated with at least one of an identity, a role, a status, or an authorization for an entity;

generating an initial risk score for at least one of the entities entity, the initial risk score being based on at a static profile attribute of the entity attributes;

receiving from a rule management module, at least one governance rule for determining a governance-rule-based risk score based on at least one of the entity attributes, wherein the at least one governance rule is configured to determine whether the entity is permitted to access or modify a particular resource based on a dynamic prime attribute of the entity attributes and a change in the dynamic prime attribute, the prime attribute being related to a status of the entity;

receiving, from the rule management module, a transaction rule from for determining a transaction-rule-based risk score based on at least one action performed by at least one entity in the plurality of entities and based on a context of network activity;

identifying patterns, using a machine learning model, that are associated with the entity attributes, the entity transaction, the source system, or a combination thereof, wherein the patterns include anomalies and behavior associated with the entity attributes, the entity transaction, the source system, or a combination thereof;

generating, using the machine learning model, a new transaction rule, a new governance rule, or both based on the identified patterns;

generating, using the machine learning model, the governance-rule-based risk score for the at least one entity based on the at least one governance rule, the new governance rule, and an entity attribute associated with the at least one entity;

generating the transaction-rule-based risk score for the at least one entity based on the transactional rule, the new transactional rule, and an action performed by the at least one entity, the action being selected from the processed event data;

generating an overall risk score for the entity based on the initial risk score, governance-rule-based risk score, and the transaction-rule-based risk score; and displaying the overall risk score on a display of a user device.

* * * * *